United States Patent
Lee et al.

(10) Patent No.: US 6,170,744 B1
(45) Date of Patent: Jan. 9, 2001

(54) SELF-AUTHENTICATING NEGOTIABLE DOCUMENTS

(75) Inventors: Warren S. Lee; William D. Meadow, both of Jacksonville, FL (US)

(73) Assignee: Payformance Corporation, Jacksonville, FL (US)

( * ) Notice: Under 35 U.S.C. 154(b), the term of this patent shall be extended for 0 days.

(21) Appl. No.: 09/161,416

(22) Filed: Sep. 24, 1998

(51) Int. Cl.$^7$ .................................................. G06K 5/00

(52) U.S. Cl. ............................. 235/380; 235/382; 902/2; 380/49

(58) Field of Search .................................. 235/379, 380, 235/382; 902/1, 2, 7, 11; 380/49, 50, 55, 56

(56) References Cited

U.S. PATENT DOCUMENTS

| | | | |
|---|---|---|---|
| 4,879,747 | 11/1989 | Leighton et al. | 380/23 |
| 5,044,668 | * 9/1991 | Wright | 283/58 |
| 5,136,647 | * 8/1992 | Haber et al. | 380/49 |
| 5,190,318 | 3/1993 | Mantegazza | 283/82 |
| 5,291,243 | * 3/1994 | Heckman et al. | 355/201 |
| 5,432,506 | 7/1995 | Chapman | 340/825.34 |
| 5,491,325 | * 2/1996 | Huang et al. | 235/379 |
| 5,509,692 | * 4/1996 | Oz | 283/70 |
| 5,594,226 | 1/1997 | Steger | 235/379 |
| 5,781,629 | * 7/1998 | Haber et al. | 380/23 |
| 5,912,974 | * 6/1999 | Holloway et al. | 380/51 |

OTHER PUBLICATIONS

Evi Constantinou, ASD Ready To Take The Bite Out of $10 Billion Check Fraud Industry, Internet News Release, obtained from Internet on Nov. 2, 1998 (dated Aug. 21, 1997 in document itself).

* cited by examiner

Primary Examiner—Thien M. Le
Assistant Examiner—Daniel St. Cyr
(74) Attorney, Agent, or Firm—Foley & Lardner (57) ABSTRACT

A self-authenticating document is created by providing a one-way hash value in a symbol creation process, and then using a public key to decrypt data of the self-authenticating document. Raw data to be provided with the self-authenticating document is received, and an account digital signature key is retrieved and used to sign the raw data. A non-repudiation hash value from a previously-created self-authenticating document is utilized, and the raw data and the digital signature key is combined with the hash value to create a new hash value for the self-authenticating document. The hashed data is then encrypted, and any non-encrypted fields are merged in to create a full data packet. The full data packet is used to provide a self-authenticating symbol, such as a bar code label, on the self-authenticating document. The self-authenticating code is used during a document verification step to ensure that the document is genuine. The non-encrypted data within the self-authenticating code contains flags indicating which public key should be used to decrypt the encrypted data within the self-authenticating code. After decryption, a checksum is performed and compared against a checksum value stored in the decrypted portion of the self-authenticating code. If they match, and if a digital signature within the self-authenticating code is verified using an appropriate public key, the document is determined to be authentic.

14 Claims, 4 Drawing Sheets

SELF-AUTHENTICATING NEGOTIABLE DOCUMENTS

BACKGROUND OF THE INVENTION

1. Field of the Invention

The invention relates to self-authenticating negotiable documents to reduce the probability of fraud. In particular, the invention relates to self-authenticating negotiable documents, such as checks, in which a self-contained closed-loop system is provided to ensure the integrity and authenticity of the negotiable documents.

2. Description of the Related Art

Check fraud is a multi-billion-dollar-a-year problem in the United States alone. This problem is only getting worse as time progresses. The true cost, when monies spent on fraud prevention systems, fraud detection and tracking systems and other support functions are factored in, quickly escalates to truly staggering figures.

Meanwhile, checks remain the most widely used instrument for the transfer of corporate payments in the United States. While highly convenient, checks present the issuer with two major issues: fraud and reconciliation.

Fraud can take on many forms. Among these are forgery, duplication of an original check, and the alteration of legitimate checks to reflect an amount not originally intended. Each of these, and their many variations, present difficulties for the existing bank infrastructure to detect and prevent. To counteract check fraud, banks and corporations have devised a number of systems and tactics. One such system is called "Positive Pay", another is called "Automated Clearing House" (ACH) electronic funds transfer, and another is the use of secure check stock. ACH requires supporting transactions formatted just for the ACH system. Positive Pay requires the issuer to create a list of checks and their amounts. The issuer then transmits the list on a daily basis to the bank of origin. Under this arrangement the bank will then only honor or clear checks that appear on the lists and are made out for the exact amount indicated by the list. Secure check stock can range from a laser printer-based system that does not use pre-printed checks to a system that uses controlled inks and printing sources, embedded information, and Ultra Violet secondary printing techniques. While these fraud-prevention systems are somewhat effective, each has well understood limitations.

Positive Pay requires that the issuer's accounting or disbursement systems be able to create a properly formatted list of checks issued, and their corresponding amounts, on a daily basis. This list must then be securely transmitted to the issuer's bank in a timely manner. Because of the amount of effort involved in creating and maintaining these capabilities, Positive Pay's appeal is limited primarily to medium and large scale businesses. In addition to the burdens placed on the issuing company, the issuer's bank must also be set up to handle Positive Pay file transfers and integrate this information into its operational flow. Compounding this is the inability of small to medium sized companies to adequately spread the cost of this daily activity over a large volume of documents. This leads to per item processing costs, which may not be justifiable. Further limiting the appeal of Positive Pay are the costs associated with setting up and maintaining the requisite communication infrastructure to support the file transfers.

In a likewise manner, ACH requires tight integration with an established service provider. The user's check printing/accounting system must support, or be modified to support, the production of ACH formatted transactions. Furthermore, additional payee information (e.g., bank of deposit, deposit account number, etc.) must be known by the issuer in order to initiate the transaction. For those instances when this information is not known, standard paper based checks must be printed and disbursed. As with Positive Pay, the economies of scale and infrastructure requirements limit the use of ACH to medium and large businesses.

Laser check printing and other on-demand systems have eliminated the need for preprinted check stock to be kept on hand, reducing the possibility of pilfered stock being used to create fraudulent documents. While helpful, this check fraud countermeasure reduces, but does not eliminate the possibility of check fraud. Likewise, it does nothing to address the exposure from counterfeiting or the alteration of legitimate documents.

Another technique for counteracting check fraud involves the use of special Ultra-Violet (UV) inks to print information directly on the check stock at the time of creation. This creates a controlled source for the paper, and creates an audit path to ensure accountability of all stock printed. The presence of the UV on the paper is used in a manner similar to a watermark to prove authenticity of the paper. These UV fields can also be used to detect when a document has been altered. The major drawback of this and other similar systems (e.g., watermarks, pantographs, etc.) is that the UV printed information is static. This approach only validates the legitimacy of the paper. Because this static information is not linked to the dynamic negotiable information (payee, amount, etc.), stolen stock can still be used to create fraudulent documents.

U.S. Pat. No. 5,594,226, issued to Steger et al., discloses an automated check verification system in which a bar code is printed onto a check. A bar code scanner reads the information contained in the bar code, and based on that information, determines a bank code and an account code. The proper bank, traveler's check company, or money order company is then contacted automatically, to determine the account status. Based on the account status, the check will or will not be processed. This process only verifies that sufficient funds exist in the account to cover or honor the document presented, is does not indicate if the request should be honored or the funds transferred. Steger works to prevent the acceptance of bad or NSF (Non-Sufficient-Fund) checks. Steger et al. has no provision for authenticating the creator of the check as being authorized to do so, nor does Steger et al. authenticate or verify that data on the check (i.e., the amount, etc.) has or has not been modified. Summarizing, Steger et al. only addresses the availability of funds.

U.S. Pat. No. 5,432,506, issued to Chapman, discloses a counterfeit document detection system, in which a secret program selects certain characters written or already on the document, and then transforms those characters into strings of characters to print on the document as a unique code. While Chapman's system may increase the likelihood of detecting that data on a document has been modified, it may not be able to detect all such changes, since it uses key data points spaced in sporadic locations across the face of the document as checkpoints. Alterations between these checkpoints will not be detected. Further, only a single layer of authentication/verification is performed by Chapman's system.

U.S. Pat. No. 5,190,318, issued to Mantegazza, discloses a document with forgery prevention means, in which a sheet-like element is provided with at least one portion for writing indications. In the indication-writing portion, regions of magnetic material spaced by magnetically blank portions are provided so as to define a code which can be detected by a magnetic reading head. Mantegazza's system is useful for providing authenticity of the paper that makes up the negotiable instrument. Mantegazza's system does not prevent fraud resulting from someone stealing the paper and creating a fraudulent negotiable instrument using the stolen paper.

U.S. Pat. No. 4,879,747, issued to Leighton et al., discloses a private key/public key system for encrypting a non-secret password into a digital signature. The password and the digital signature are encoded and stored on a magnetic stripe or other memory device of a card. To effect a transaction, the digital signature on a received card must be shown to have been generated from a password on the received card. Leighton et al.'s system and method provide verification that the person physically presenting the card is indeed the person to whom the card was issued. Leighton et al.'s system and method utilize an interactive system that requires the interaction of both machine and human controls, such as having the user input his or her personal identification number (PIN), and is thus well-suited for interactive sessions. However, Leighton et al.'s system is not well suited to situations where the time and location of the document's creation are quite different from the time and location where the document must be authenticated. Furthermore, Leighton et al.'s system and method use a visual inspection to determine if the person presenting the card matches the "picture" password. Visual inspection is an inexact science and increases the possibility of fraud and/or counterfeiting. Lastly, the card and the information stored therein are used to authenticate a separate element, i.e., the person presenting the card. Therefore, Leighton et al.'s system and method are not self-authenticating.

SUMMARY OF THE INVENTION

It is an object of the invention to provide a self-authenticating system and method for a negotiable instrument, such as a check.

It is another object of the invention to provide a self-authenticating system and method that utilizes one-way hashing to provide a level of security in counteracting fraud.

These and other objects and advantages of the invention may be achieved by a method of providing a self-authenticating negotiable document. The method includes a step of receiving data to be included on the negotiable document. The method also includes a step of signing the negotiable document with a digital signature key. The method further includes a step of protecting the encrypted data encrypting the data and the digital signature key by computing a one-way hash value from the items. The method still further includes a step of outputting a data packet that includes the encrypted data from the previous step. The data packet is used to print the symbols and human readable data onto the negotiable document so that it is now self-authenticatable.

The above-mentioned objects and other advantages of the invention may be achieved by a method of digitally signing data using a Public/Private Key (PPK) pair methodology. The method includes a step of receiving data to be sent in a secured form. The method also includes a step of providing a digital signature to be sent with the data, the digital signature being encoded/created using a private key. The method further includes an optional step of encrypting the data using a PPK based encryption algorithm such as RSA Data Security Inc.'s RC6 block cipher, Data Encryption Standard (DES), Elliptical Curve Cryptography (ECC), or similar. The method further includes a step which uses the data (encrypted or not), the Digital Signature, and the hash value from a previously produced symbol and produces a one-way hash value using a secure hashing algorithm (SHA-1) or a memory digest (MD4, MD5, etc.) function or other such known algorithms. The use of a previous hash value produces a chain of interlocked documents thus making it impossible for the author to refute their creation of said document. The method still further includes a step of encoding the encrypted data, the encoded data being output as a data packet in symbol form.

The above-mentioned objects and other advantages of the invention may be achieved by a method for authenticating and validating contents of a data symbol. The method includes a step of determining if the data symbol has been encrypted, and if so, decrypting the data symbol using a public key. The method also includes a step of computing a check sum on the decrypted data symbol. The method further includes a step of comparing the computed check sum with a check sum value included in the data symbol and retrieved from the data symbol through the decrypting of the data symbol to determine if the decrypted data symbol is error free. The method still further includes a step of verifying a digital signature provided with the data symbol using a public digital signature key. If the comparison in the third step and the verification in the fourth step are successful, the data symbol is authenticated and validated. The data contained in the symbol may now be used to authenticate the contents of the human readable portions of the document.

The above-mentioned objects and other advantages of the invention may be achieved by a method of creating self-authenticating documents. The method includes a step of printing human readable data, magnetic readable data (MICR), and symbol-based data on a single document. The method also includes a step of digitally signing the data to be placed in the symbol so that the single document is capable of being authenticated using the symbol-based data without contact with a creator of the single document or data related to the creation of the document.

The above-mentioned objects and other advantages of the invention may be achieved by a system for creating a self-authenticating check. The system includes a database containing, or a methodology for managing, the data to be used in creating the self-authenticating check. The system also includes a validation unit communicatively coupled to the database/data management system and configured to receive the data and to validate whether or not the data can be used in creating the self-authenticating check. The system further includes a merge image and signature unit communicatively coupled to the validation unit and configured to merge an account physical signature, a physical signature code, public and private keys, logo's and other facial characteristics of the document with the data received from the validation unit. The system still further includes an encryption unit communicatively coupled to the merge image and signature unit and configured to encrypt the data with the account digital signature key. The system also includes a symbol creation unit communicatively coupled to the encryption unit and configured to further encrypt the data using a PPK based encryption algorithm (e.g.—RC6, ECC) and by storing it in a symbol based format. This unit also computes the one way hash value using a secure hashing function and the value of a previously created document. The merge image and signature unit merges the encrypted data output from the symbol creation unit with non-encrypted data to be used for decryption. The system also includes a printing unit communicatively coupled to the merge image and signature unit and configured to print a self-authenticating symbol onto the self-authenticating check, the self-authenticating symbol being based on the encrypted data output by the merge image and signature unit.

The above-mentioned objects and other advantages of the invention may also be achieved by a system for authenticating a self-authenticating document, which includes a reader configured to read and interpret characters printed on the self-authenticating document. The system also includes a symbol decrypter communicatively coupled to the reader and configured to decrypt data provided within the symbol printed on the self-authenticating document. The data contained within the symbol is decrypted and authenticated using the public key(s) as prescribed in the encryption and signature algorithms.

BRIEF DESCRIPTION OF THE DRAWINGS

The above and other objects, advantages and features of the invention will be more apparent from the following description taken in conjunction with the accompanying drawings, in which.

DETAILED DESCRIPTION OF THE PREFERRED EMBODIMENT

A preferred embodiment of the invention will be described in detail below with reference to the accompanying figures. The invention provides a way of ensuring the creation of fraud-proof documents, which can be incorporated into existing customer payment systems, thereby providing an integrated turn-key solution to the negotiable document fraud problem. The invention also eliminates the need for file creation, as in Positive Pay/ACH systems, which would be required by a customer to operate with such system by the customer. The invention also removes the additional processing and record keeping of Positive Pay/ACH by the bank of origin.

One preferred embodiment of the invention utilizes a laser check printing system, along with an industry standard Printable Data File (PDF), as well as encryption and key management systems, to create a fraud-proof check creation and authentication system.

Figure 1:
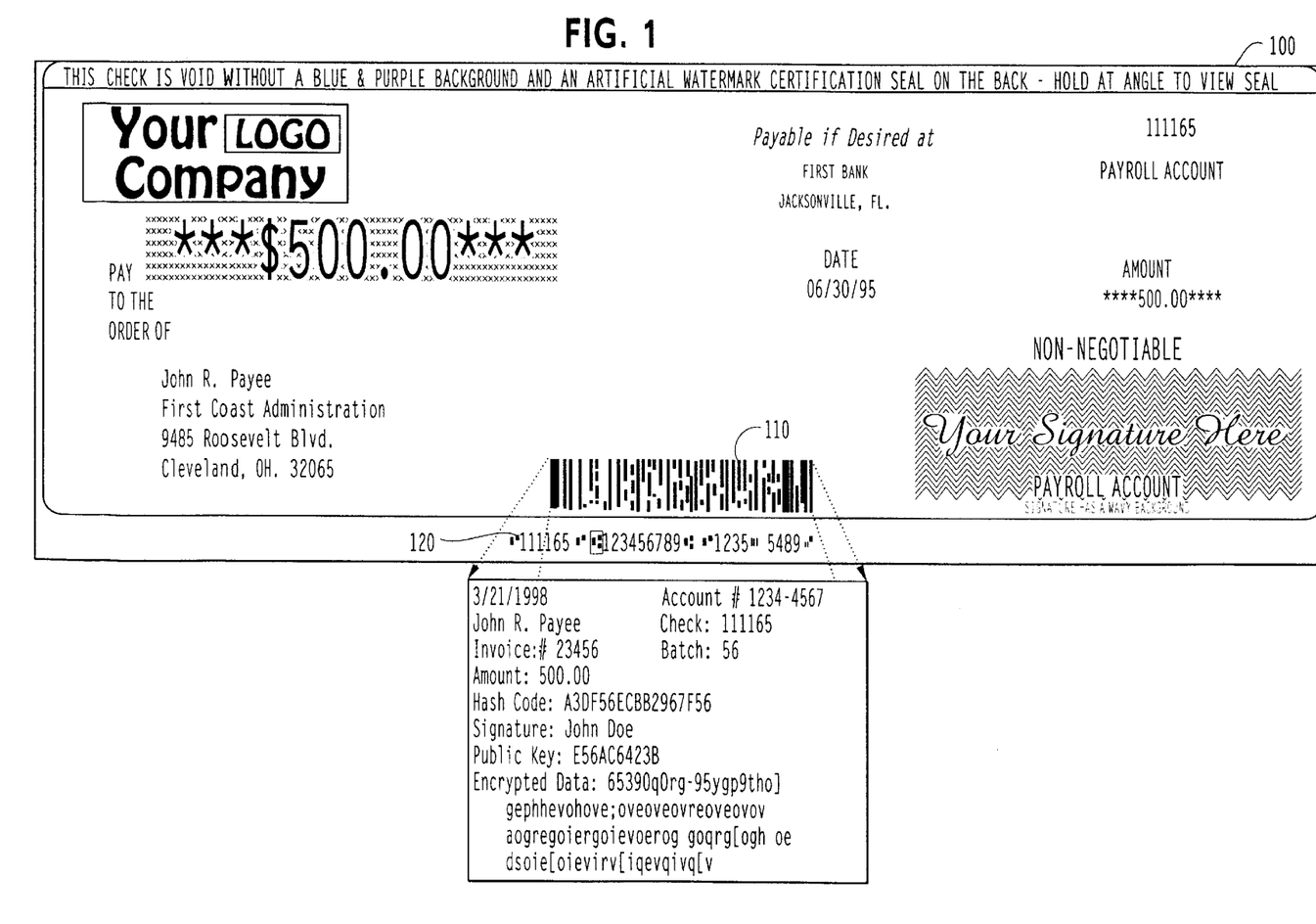
FIG. 1 is a diagram showing a self-authenticating document created according to the invention.

Banks that have image capable compatible check reader systems, such as NCR's Model 7780, can readily offer a fraud-proof system and method to their customer base without the added complexities of Positive Pay or ACH. According to the invention, information is encrypted at the time of document creation, using a public key/private key methodology. This information is then stored as a PDF (or similar type of file) that is printed on the document itself. FIG. 1 shows such a check, in which PDF is printed as a two-dimensional bar code 110 onto the bottom-middle portion of the check 100. The PDF can be printed in nay location on the document so long as it does not interfere with other reserved or allocated areas. The bar code 110 contains information used to authenticate the document, such as payee's name, invoice #, amount of check, hash code, public key, account #, check #, and date of check.

When the document reaches the bank of origin, the bank reads the PDF, decrypts the information using the same public key/private key methodology, and validates the information with a unique one-way hashing system. If the reader sorter is fully PDF compatible these operations can occur within the unit. For image enabled reader sorters which are not PDF enabled, a separate computational device can be communicatively connected to the reader sorter, the image is then passed to the computational device and the validation and authentication process performed there. The bank then compares the validated information with information printed on the document face, printed on the MICR line 120, and captured in the clearinghouse process. The utilization of these three data sources enables authentication of the document.

Hashing, as is known to those skilled in the art, is a mathematical transformation that takes an infinite length value (such as a string of text), and produces a unique fixed length representation of the data. This is conceptually similar to how a person's DNA is a compact structure that is a unique representation of that individual. Just as DNA can be used as a unique identifier of the much larger and complex person, hash values can perform the same analogous function for the digital world.

One-way hashes are utilized in data communications systems to prevent what can be thought of as the "digital cloning" of data. One-way hashing is a process whereby a hash value is mathematically processed to recreate the original data. One-way hashes mathematically ensure that the transformation that produced the unique hash value cannot be used in a reverse process. Furthermore, one-way hashing equations have been developed for which it is computationally impossible to determine two values that produce the same hash value. These type of one-way hashing equations are used in the invention to provide a foolproof fraud prevention and authentication system and method.

According to the invention, the hash-based encoding feature creates a document whose time, point of origin, and originator cannot be repudiated. This is proof positive of the document's authenticity and validity.

The format of the PDF according to the invention is highly flexible, and can support the inclusion of a wide range of information and data. For example, supplemental information, as specified by the originating bank, can be encrypted within the PDF to aid the bank in truncating of the check paper processing trail. Alternatively, or in conjunction with this data, information useful for customer reconciliation of the individual checks (such as invoice number, processing batch run, department, etc.) can be included in the PDF. This enables banks using PDF-compatible readers to create an additional transaction-based information stream. This additional transaction-based information stream may be provided back to the user, either free or for a fee, for reconciling accounts. This information, when combined with the traditional data (date cleared, etc.), can be packaged by the bank and delivered to the customer in an electronic format to speed up and lower the labor cost of the reconciliation process. This combination of fraud prevention, truncation, and lower reconciliation costs are a result of the system and method according to the invention.

In the invention, each customer has a check printing system, preferably a laser check printing system. Other types of printing systems, such as ink-jet printing systems, may be utilized instead of laser-based printers. The customers would be provided with all of the software, along with the interface to each customer's accounting system, necessary for creation and printing of self-authenticating checks according to the invention. As a result, system modification, file transfer capabilities, software upgrades and other hassles and inconveniences normally associated with Positive Pay/ACH installations are eliminated. The only requirement for potential customers is the readily available printer for printing the self-authenticating codes on the face of the documents. For example, each customer would have an MICR-capable laser printer for that purpose.

The system and method of the invention offers significant flexibility in configuration and operation. An encryption engine used with the invention supports the existing security and encryption policies of the bank. Support can be added for third party encryption technology (e.g., triple DES, RSA, etc.) as well as token-based authentication mechanisms, such as SecureID, Vasco, Smart Cards, digital certificates, and the like. A key management system (see elements 688 and 655 in FIG. 2) manages the full life cycle, from creation, to replacement, and on through retirement of the public key/private key sets. The key management system can likewise be used to support the issuance and management of token-based authentication devices (SecureID, digital certificates, etc.). The key management system used in cooperation with the invention preferably is a technology/manufacturer independent system. Such a system can be used by the issuing banks to support the creation and management of all token-based authentication devices used throughout the bank, regardless of the application, thereby creating a centralized control and disbursement point.

Figure 2:
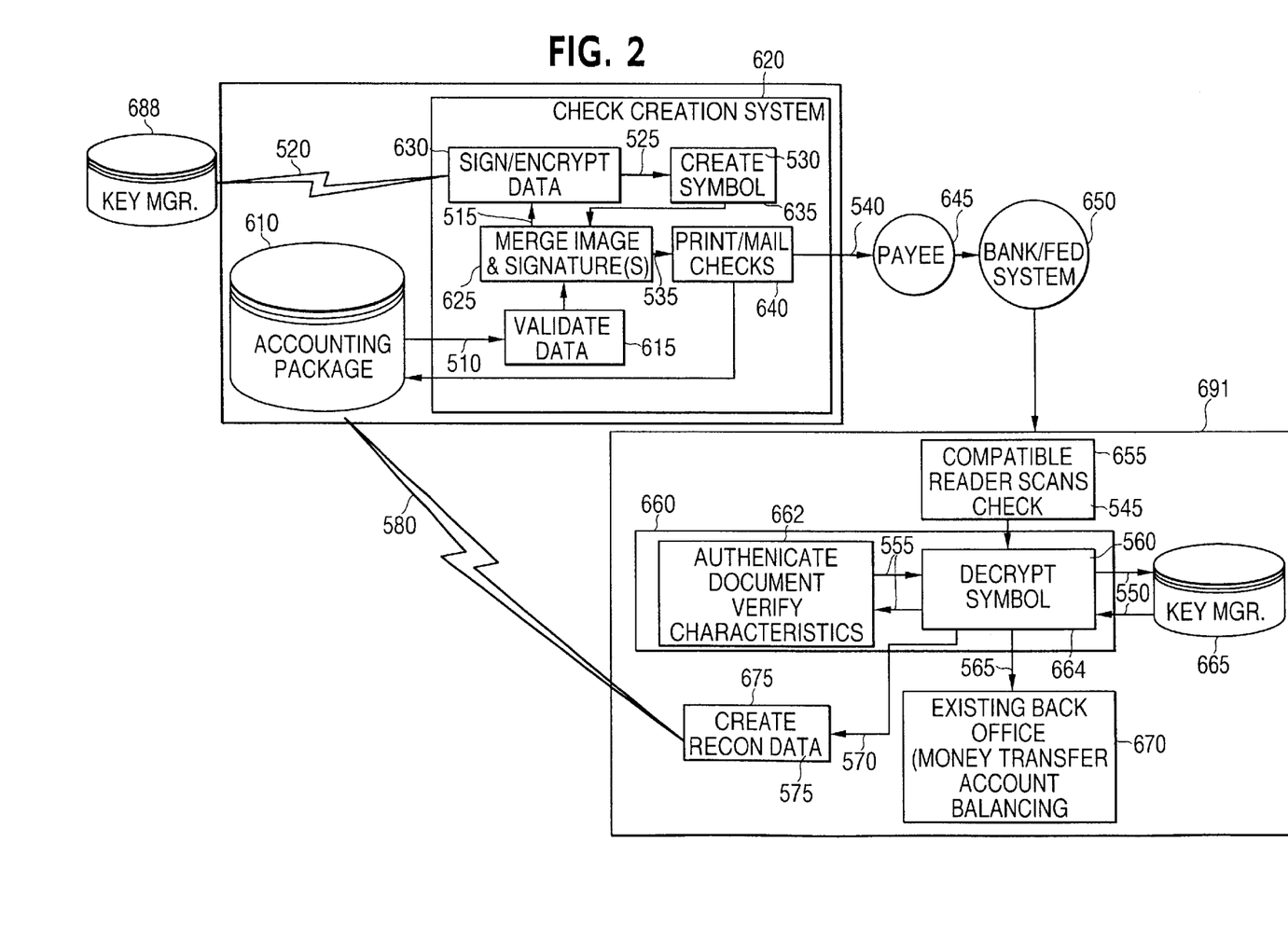
FIG. 2 is a process flow diagram showing the closed-loop structure of the invention.

FIG. 2 is a graphical representation of the process steps of the invention. Several details have been omitted from the figure for the sake of clarity and brevity; these details will be discussed in detail in a later section. The circular nature of the process flow of FIG. 2 is intended to highlight that the invention is a closed-loop system that can simultaneously eliminate both the bank's and their customers exposure to fraud. In FIG. 2, the dashed arrows and the elements that have a cross-hatched interior symbols represent optional features that are not required for operation of the invention. In this example, the bank of origin is shown as the first enabled point in the process. All portions except the check for duplicate documents can easily be migrated to retailers and other receivers of checks.

In process flow 510, information regarding checks to be printed is passed from the customer's accounting or payment system 610 to a data validation element 615 of a check creation system 620 of the invention. After the data is validated, it is passed on to a merge image and signature element 625. The validation is performed by the check generation software (i.e. MICR-LASER printing system). This process verifies that all of the required data elements are present in the data file and that the file is formatted correctly and has not been corrupted.

In process flow 515, the check information is processed against predefined constraints and requirements. Examples of these are signing authorities, dual signatures for items over a defined limit, and so forth. Signatures, if on file, and if the user is authorized to access them, are appended. The appending function is performed by the check generation software (e.g. MICR-LASER system. As a result, a digitized signature is created, which may also be encrypted. Sign/Encrypt data element 630 performs the encryption and digitized signature functions based on data received from merge image and signature element 625. Data flags indicating whether the signature(s)e have been automatically added are added to the data to be included in the symbol. This information can then be used by the banks during the decryption/authentication phase to flag a document for verification that the proper manual signatures have been added. This is a big advancement for the banks, in that now, due to sheer volume it is impossible to visually verify the signatures on each check. This method will greatly reduce the volume needing inspection by pre-clearing documents with known good signature patterns.

FIG. 2 shows an optional feature of the invention, whereby periodic communication between the system according to the invention and a private key/public key issuing entity 688 are utilized, so as to provide updated or validated encryption keys for use by the system. This periodic communication is shown as process flow 520. For example, a particular key may be assigned based on the time of day.

Using a public/private key methodology, all data necessary to authenticate the document is encrypted, and then output in a process flow 525. A separate non-reputable one-way hash is computed.

In process flow 530, the data packet is processed by create symbol element 635, and a symbol (e.g., PDF417) representation is created.

In process flow 535, the symbol is merged, using merge image and signature element 625, with the information necessary to produce the normal components of a check (account number, date, amount, etc.), to produce the final print data set. In particular, the symbol data is merged with the check information data, so as to create a print data set, or data packet. The data packet is used to print a check with all of the check information data printed thereon, and with a self-authentication symbol printed at a particular location on the check. The final print data set is provided to print/mail checks element 640.

In process flow 540, checks are printed and sent to Payee 645. Normal bank processing passes these through the federal clearing house system 650 and finally on to the bank of origin.

Figure 3:
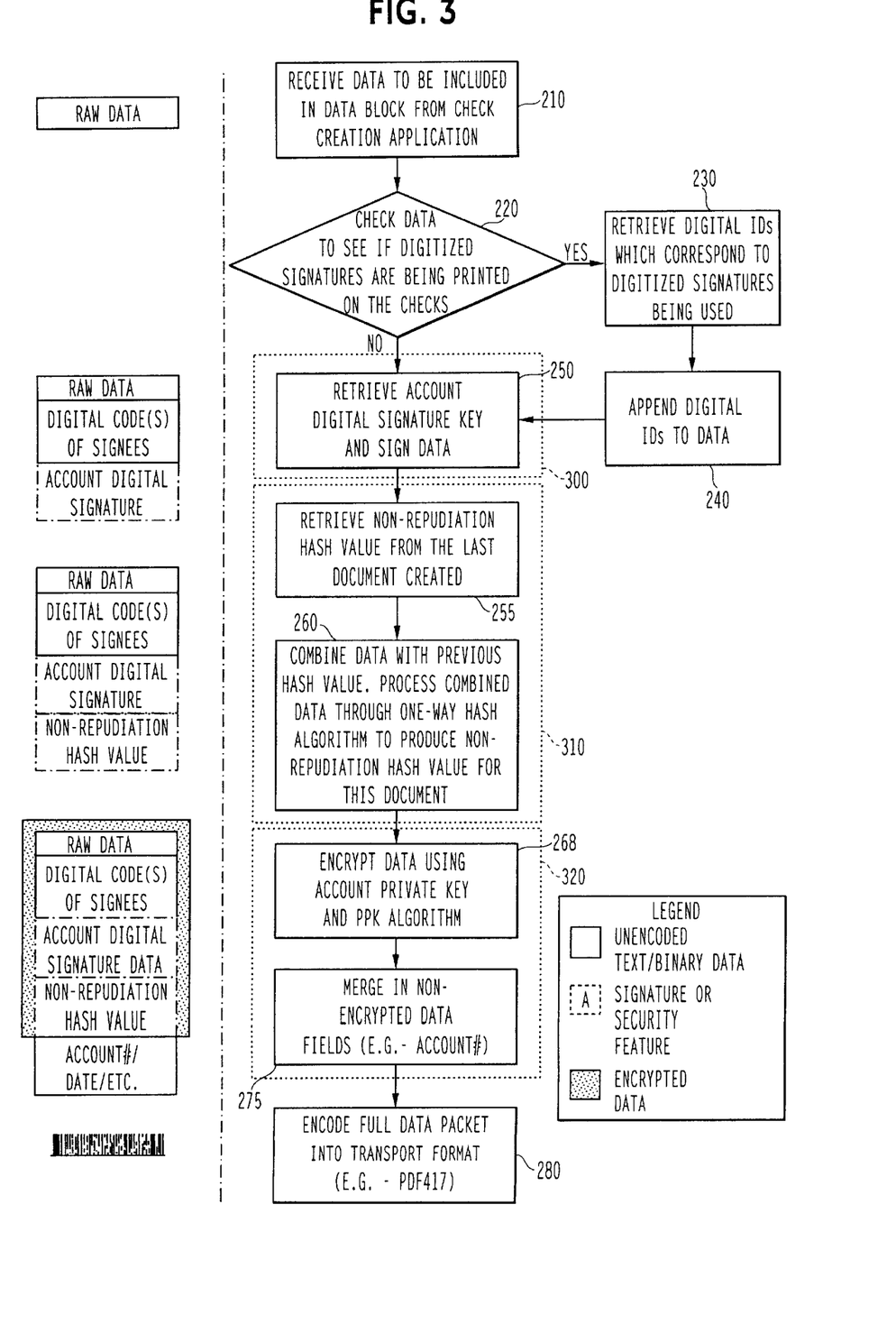
FIG. 3 is a flow diagram showing the steps in a symbol creation process according to the invention.

In FIG. 3, the elements with in the box labeled 691 correspond to the first point of the clearing process, which may correspond to a bank of first deposit, a check cashing facility, or a retailer, for example.

In process flow 545, the check is scanned by a PDF compatible reader 655. This is assumed to be a truly PDF enabled device or an image enabled check reader sorter with a decryption/authentication device communicatively attached as described earlier in this document. The reader 655 creates the normal data output currently in use today. In addition, the reader 655 outputs the symbol to a symbol processor 660. The symbol processor 660 may be integrated into the reading device or may be implemented as a stand alone device.

In process flow 550, the decrypt symbol portion 664 of the symbol processor 660 retrieves, from a key manager 665, the encryption keys necessary. In process flows 555 and 560, the symbol processor 660 performs the necessary decoding and validation procedures, and if verified (by the authenticate document portion 662 of the symbol processor 660), uses the data to validate the data on the face of the document (e.g., handwritten amount of check, handwritten name of payee). This includes comparisons with any MICR data encoded during the clearing house operations. A check for duplicate document submissions is also performed at this stage.

In process flow 565, the data normally passed on to the remainder of the bank's back office operation 670 (data generated by conventional readers) is split out and forwarded.

In process flow 570, data from the symbol regarding the check itself (date cashed, amount, payee, etc.) is bundled, or combined, with the user specified data (invoice #, batch run, receiving number, etc.), and the verification and authentication data.

Process flow 575 is an optional process flow that takes place within create reconciliation data portion 675. The create reconciliation data portion 675 of the bank/financial institution sorts all of the data, culls it with other existing customer data, and creates electronic reconciliation statements. These statements can be provided to the customer and used by the customer to automate the reconciliation process. Information, reports and statements regarding account activity are forwarded to the customer in optional process flow 580.

The system and method according to the invention encrypts all of the variable information at the time of document creation. A public-private key methodology is employed to securely sign and/or encrypt the data, and the result is printed in symbol format on the document itself (see FIG. 1). By way of example, the variable data for a check could be the payee, amount, account number, signature(s), date, and so forth. Static data is considered to be logos, borders and other such information normally found on a pre-printed check. The definition of what encompasses variable and static data can and will change according to the document type (i.e.—check, money order, etc.).

Negotiable document fraud can be categorized into three main classifications. Document duplication, document alteration, and counterfeit documents. The invention is a closed loop system encompassing both document generation as well as the back end processing and clearing functions. The variable data is captured and encrypted during the document creation process. According to the invention when the document reaches the first point in the clearing process, the PDF is read and decrypted using the appropriate public-private key set. This point may include the bank of first deposit, a check cashing facility, or a retailer. The ability to produce valid results using a PPK encryption and/or digital signature process verifies the sender to be authentic and the data valid. If these do not verify, then the document is flagged for manual intervention. If verified, then the data packet transported via the PDF can be used to verify that the variable and MICR data on the face of the document has not been altered and is indeed correct. The utilization of these three data sources (PDF, variable data, and MICR line) enables authentication of the document. The hash coding function verifies the time, content, point of origin, and originator of the symbol data in a manner which cannot be repudiated. When combined, these processes provide positive proof of the document's authenticity and validity. Thus, a system and method according to the invention seeks to be fraud proof, rather than fraud resistant.

Fraud can take on many forms. Among these are duplication, forgery, and alteration of legitimate documents to reflect an amount or payee not originally intended. The first of these, document duplication, is detected by the back end processing portion of the invention (see element 691 in FIG. 2). The back end processing portion keeps records of all documents previously read/cleared for a given source or account. This function is located at the processing center of the originating. Thus, as duplicates are processed, all subsequent documents will be highlighted and rejected as previously processed items.

The invention encompasses a baseline and two optional security features. These features are data encryption and physical paper security. Physical paper security may include paper with magnetic strips, or paper with fluorescent sensitive fiber, UV printing, or other types known in the art. The system and method according to one embodiment of the invention provides fraud protection for everything except document duplication. The use of physical paper security features, such as those described above, requires customers to use specialized paper. In these cases, the authenticity of the negotiable document can be easily and independently verified by the system and method according to another preferred embodiment of the invention. In this second embodiment, additional information is encoded into the PDF to indicate to the recipient that existence of these features should be verified. Thus, a copied document would indicate, via the PDF, that a UV signature should be present. However, the copied or fraudulent document will not have such markings. Thus, duplicate documents can be easily identified by the invention according to the second embodiment.

Document counterfeiting can be detected in two different ways. First, the paper characteristics (as described above) if so employed, can be used in a manner similar to that discussed above with respect to the document duplication. Second, since a counterfeiter will not have access to the customer's private key, it is mathematically impossible for the counterfeiter to systematically generate properly encoded one-way hash values, digital signatures, and encryption (if that feature is enabled). Thus counterfeit documents will be completely detectable upon presentment to the originating financial institution. The back end processing system maintains a record of accounts which are required to have PDF information. Thus, if a counterfeiter fails to include a PDF, the document would be flagged and marked as suspect.

The third form of fraud, document alteration, can easily be detected and flagged by comparing the facial information of the document (amount, etc.) with the contents of the symbol data packet.

A detailed description of the symbol creation and the document verification procedures of the invention is provided below.

The following describes how the system and method according to the invention encrypts/signs the data in question and then verifies it. To aid in the explanation of the invention, the description that follows below for the symbol creation part of the invention is given in a process/flow format, as shown in FIG. 3. The text to the left of the vertical dashed arrow in FIG. 3 corresponds to the substance of a data packet at each stage of the symbol creation process. The right of the vertical dashed arrow in FIG. 3 shows the steps that are performed to create a full data packet as a transport packet.

In step 210, information relating to the document to be created is received from the accounting system or other check creation system used by the customer. This information or raw data may include, by way of example, check number, amount to be paid, account number, MICR line encoding values, payee name, signatures required and other such like items. The system and method according to the invention does not limit the amount of information that can be encoded and transmitted. A practical limitation may result from the type of transport used (bar code, PDF417, etc.) and the surface area that is available on which to print.

If a digitized signature of the payee is to be applied to the document during the printing process, as determined in step 220, the digital ID of the payee's signature to be used is retrieved in step 230, and appended into the data packet in step 240. This is an optional function of the invention. That is, in systems that do not use digitized signatures of payees, the determination to be made in step 220 is bypassed.

The three step/steps within labeled regions 300, 310 and 320 in FIG. 3 can occur in any order and still provide valid results. The invention is intended to cover the use of these three step/steps in conjunction with one another. The performance of the three step/steps in all possible ordering combinations is contemplated in the symbol creation process of the invention. The following sequence depicts one of these combinations, by way of example and not by way of limitation.

In step 250, the digital signature private key for the account being used is retrieved. A digital signature algorithm, for example Digital Signature Algorithm (DSA), the Digital Signature Standard (DSS), or other commercially is run and a digital signature for this document is created. The account digital signature private key may be, but is not required to be, part of a PPK structure run by or administered on the behalf of the institution that the account is drawn against.

In step 255, the non-repudiation hash value from the most recently created previous document is retrieved. In the case where the document being created is the first one for this account, a randomly generated seed hash value is used and recorded.

In step 260, the previous non-repudiation hash value (or randomly generated seed hash value if it is for a first document) is appended to the data packet, and the resultant data stream is processed through a secure one-way hashing algorithm, such as Memory Digest 5 (MD5) or Secure Hashing Algorithm (SHA-1). The resultant value, which is the non-repudiation hash code for this document, is appended to the data stream. In the system and method according to the invention, all hashing functions used are both one-way and collision free. Those skilled in the art will recognize that one property of hash functions is that no two data sources can produce the same result. Thus, by tying the previous non-repudiation hash value to the next document to be created, a chain is formed. To highlight this feature, assume 10 documents have been created in a particular sequence from document 1 up to document 10. If the issuer denies that it created document 5, then it must also refute the creation of documents 6 through 10. This is because the non-repudiation hash value for document 6 is based upon, in part, the value from document 5. Thus, if document 6 were valid, then the previous value used in the creation of its non-repudiation code must have come from document 5. Any other value used is guaranteed to produce a different hash value for document 6 than the one created.

A checksum for the data packet is computed and appended to the data packet. Until this point in the process, only digital signatures and hash values have been appended to the data stream. The data stream itself has not been encrypted. In optional step 268, a private key (e.g., a key for the company or a key for an account of a company) could also be issued per account if desired) is retrieved and used to encrypt the entire data packet. For example, a secure algorithm such as RC6, elliptic curve, or other similar functions can be used for encryption. This is done so that entities without authorized access to the corresponding public keys of the company or the company's account cannot determine the format and contents of the data packet. This provides an additional layer of security through obscurity. The private key used for encrypting is different than the private key used for the account digital signature in step 250.

Additional information, such as unencrypted account code and date (used to look up public key(s)), and other related information is appended to the data packet in an optional step 275. Other related information would include, for example, flags to indicate the signature and encryption algorithms used, the order of their use, and user specified options such as paper security features.

In step 280, a data packet is encoded into the format selected (e.g., PDF417, bar code, etc.) to produce a transport symbol. The transport symbol can be used to print a self-authenticating symbol onto a document, or it can be sent out over a network along with the document data to provide for a self-authenticating document. Such a network can be a secured network or an unsecured network, such as the Internet.

Figure 4:
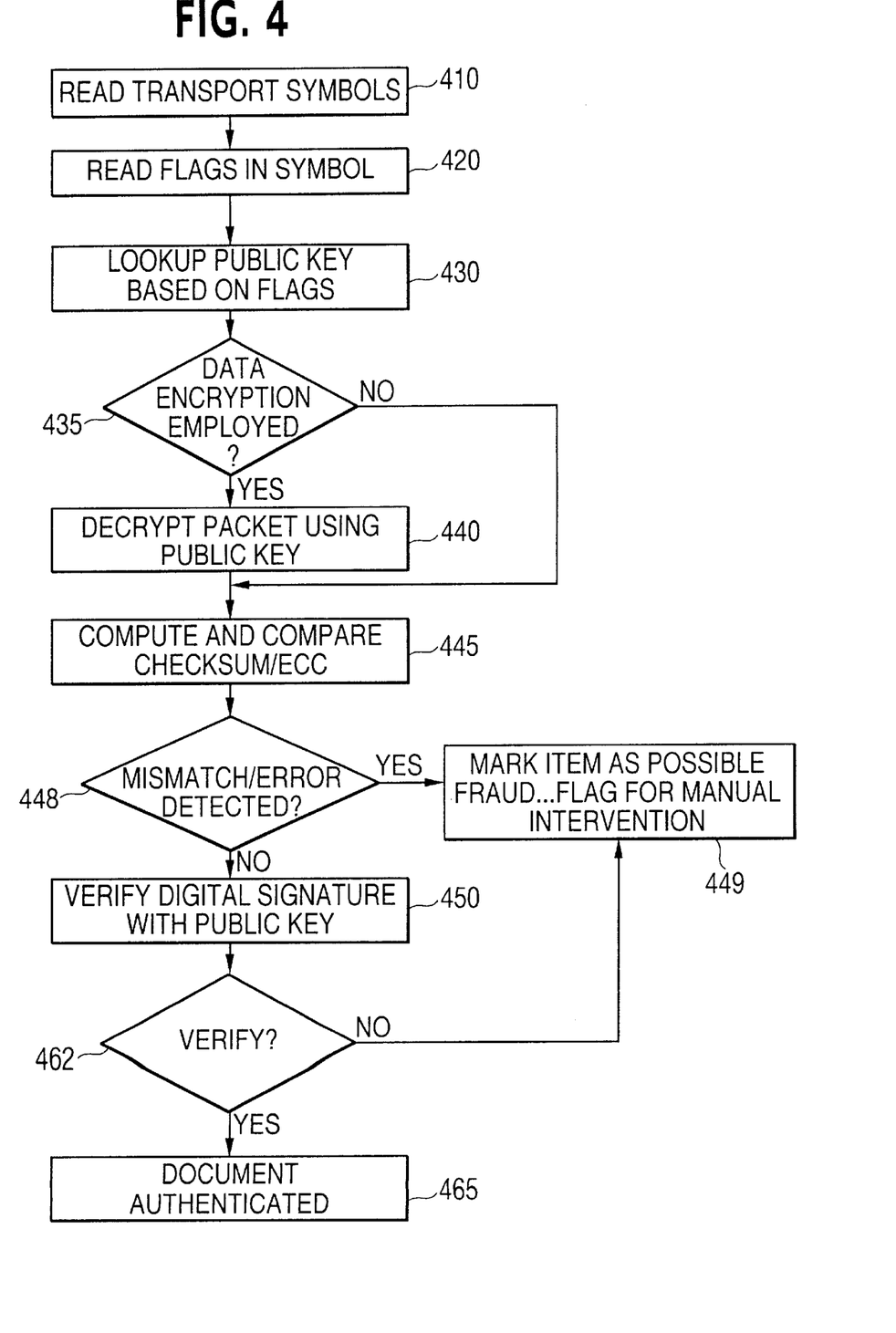
FIG. 4 is a flow diagram showing the steps in a verification process according to the invention.

The following steps given in flow diagram form in FIG. 4 correspond to a document verification procedure used in the invention.

In step 410, the party wishing to verify the document reads the transport symbol. For a physical document, such as a check, the transport symbol is read from an optical scan of the document. For a non-physical document, such as a data packet corresponding to a wire transfer of funds sent over a network, the symbol data portion of the data packet is read. By way of example and not by way of limitation, the transport protocol is assumed to be PDF417.

In step 420, flags for special or optional features, as well as configuration and creation processes data used, are read. The flags are part of the non-encrypted data merged into the data packet during the symbol creation process. If paper security features have been selected then the device, if so enabled, must check for the existence of these features. If not enabled, then the device notifies the operator to verify the existence of these features or mark the document for later verification.

In step 430, the user account ID, document creation date, and some or all of the flags from step 420 are used to look up the public key(s) that should be employed to decrypt the data and verify the document. The document creation date is utilized to support periodically changing the key sets. Because of the lag in the paper processing system, it is possible that in the time between a creation of an item and the processing of that item, the key sets for a given customer/account have been changed. The inclusion of the document creation date insures that the proper set is used. The flags read in step 420 are needed so that the exact encryption algorithm used in the creation process can be determined and the proper key set returned.

In step 440, if data encryption was employed (see steps in region 320 of FIG. 3), as determined in step 435, then the public key is used to decrypt the packet. The type of encryption used (blowfish, RSA, etc.) is determined from the flags read in step 420. The system and method according to the invention supports the use of N encryption types, where N is an integer greater or equal to one. Under this arrangement, for example, customer A may use RSA for encryption while customer B uses IDEA. In a likewise manner, each customer may use some or all of the encryption algorithms available based upon a predetermined data points or in a random fashion. Once the data is decrypted, a checksum is computed and compared against the checksum value stored as data in the packet in step 445. If they do not match, as determined in step 448, the document is flagged as possibly fraudulent or corrupt and marked for further intervention, as noted in step 449.

In step 450, the signature created in step 250 of the symbol creation process (see FIG. 2) is verified using the appropriate public key. The signature method employed, e.g., DSA, DSS or equivalent, is determined from the flags read in step 420. If the signature verifies, as determined in step 462, and the checksum computes correctly (see step 448), then the contents symbol are assumed to be both authentic and valid, as noted in step 465. If either fails, the item is marked as altered/counterfeit and flagged for future intervention, as given in step 449.

As mentioned in the description of the symbol creation process, the exact sequence of signatures creation, data encryption, non-repudiation hash value computation can be interchanged. Some of the flags read in step 420 are used to indicate the sequence used. Thus, steps 430, 440, and 450 of the document verification process are interchangeable and are executed in the proper sequence as indicated by the flags. That is, based on the specific order of steps in the symbol creation process, that same order is utilized, but in reverse order, for the document verification process.

If the document verification processing steps are being executed at the bank of origin/issuance, then the check and account number as indicated in the MICR line of the check are searched against a file/database of previously processed items and account restrictions. If a match is found with a previously processed item, then the item is rejected, marked as a duplicate item, and flagged for further intervention. If a code indicating a restriction that a requirement exists for symbol based data to be present, then a verification for the existence of a valid symbol is performed. If no symbol is found, then the item is marked as altered/counterfeit and flagged for future intervention.

Once the data contained within the symbol has been authenticated and verified, it is used to authenticate and verify the MICR and human readable data points/fields. By way of example, the field names of a commercial US check may be used. The field names and their contents will vary, dependent on the type of document processed.

If flags have been set to indicate the use of security features in either the paper or the print, and if the reader has the capability to verify the existence of these, then a check for these features is performed. If the features are not found, then the item is marked as counterfeit and flagged for further intervention. If this step is being performed by a retailer, bank teller, or other non-processing center entity, then the user will be prompted to check for these features if possible. If the retailer/teller does not find the indicated features, then the item is marked as counterfeit and flagged for further intervention.

The MICR line of a check contains fields for the check number, account number, the transit number, and optionally the amount of the check. The data contained in these fields is passed from the reader and compared to the same information as transmitted by the symbol. If a discrepancy is found between any of the fields present, then the items is marked as altered and flagged for future intervention. This step is only performed by locations which have MICR capable readers. It is always performed at the bank of origin/issuance. At this time a comparison of the human readable data (payee, date, amount, etc.) can be made by presenting this data (i.e.—manual keying, OCR, etc.) to a processor that is capable of reading such data. If a discrepancy is found, then the item is marked as altered and flagged for intervention.

If this process is being performed by a retailer or teller, then the user is prompted to enter the data points from the face of the check. Each point is verified against the symbol data and any discrepancies found result in a prompt to verify the data entered. If a discrepancy is found, the system and method according to the invention provides an indication that the check has been altered and should be flagged for intervention. For installations which are MICR enabled, the contents of the MICR fields are compared against the facial data entered, and the symbol data as a cross check. If a discrepancy between two of the fields had been indicated earlier and 2 of the 3 fields match, then the user is prompted to verify the facial and MICR data for a bad entry. If no bad entry is found, then the check will remain flagged for future intervention.

If the item has completed each of these steps and has not been flagged for intervention, then is has been authenticated and deemed valid.

The invention incorporates several different processes, techniques, and data elements. The invention creates layers of security, which, when combined produce a completely fraud proof document. The invention eliminates the need for file creation and information transfers, as in Positive Pay or ACH, while simultaneously eliminating the additional processing and record keeping of Positive Pay/ACH by the bank of origin. The invention combines an on demand MICR check printing system (e.g., MICR laser check printing system), industry standard machine readable data formats (i.e., PDF417, bar codes), and leading edge encryption and key management systems to create a fraud proof check creation and authentication system.

By utilizing the invention, banks, financial institutions, and other issuers of negotiable documents (i.e., checks) can offer a fraud proof system to their customer base without the added complexities of Positive Pay or ACH. By way of explanation, the PDF format will be referenced as the data transport mechanism. Of course, the invention can utilize any machine readable printed format to place and recover information on negotiable documents.

The self-authenticating symbol provides a check sum of the entire check, using a one-way hash value. At the verification end, the self-authenticating symbol is compared to a checking value obtained by performing a known operation on the data obtained from the check. For example, all numbers and letters on the check may be mapped to a particular number, and added. The sum of all of the numbers and letters on the check would be compared to the value of the self-authenticating symbol, and if they agree, the check is validated. Once this is done, the digital signature on the check can be verified by applying a public key to the digital signature, to see if it is valid.

While preferred embodiments have been described herein, modification of the described embodiments may become apparent to those of ordinary skill in the art, following the teachings of the invention, without departing from the scope of the invention as set forth in the appended claims.

What is claimed is:

1. A method of providing a self-authenticating negotiable document, the method comprising the steps of:
   a) receiving, by a single entity, data to be included on the negotiable document;
   b) signing, by the single entity, the negotiable document with a digital signature key;
   c) providing, by the single entity, an authenticating data value by computing a one-way hash value from the data and the digital signature; and d) outputting, by the single entity, a data packet that includes the authenticating data value, wherein the data packet is used to provide data for creating a self-authentication symbol for the negotiable document.

2. The method according to claim 1, further comprising the steps of:

e) between the steps a) and b), checking the data to determine if digitized signatures are to be printed on the negotiable document, and if so;

f) retrieving digital identification codes from a data base, the digital identification codes being used in the step b) in the signing of the negotiable document.

3. The method according to claim 1, wherein a most-recently-used hash value from a previously-created negotiable document is used in computing an updated hash value for the step c).

4. The method according to claim 1, wherein the self-authentication symbols are utilized by a processor to validate at least one of a creator of the negotiable document, printed contents of the negotiable document, and the self-authentication symbol itself.

5. A method of digitally signing data using a public key and private key methodology, the method comprising the steps of:

a) receiving, by a single entity, data to be sent in a secured form;

b) providing, by the single entity, a digital signature to be sent with the data, the digital signature being encoded with a private key;

c) obtaining, by the single entity, a self-authenticating data value for the data by computing a one-way hash value; and d) outputting, by the single entity, the self-authenticating data value, the data and the digital signature as a full data packet.

6. The method according to claim 5, wherein a most-recently-used hash value from a previously created full data packet is used in computing an updated hash value to be used in the step c).

7. A method for authenticating and validating contents of a data symbol, comprising the steps of:

a) determining if the data symbol has been encrypted, and if so, decrypting the data symbol using a public key;

b) computing a check sum on the decrypted data symbol;

c) comparing the computed check sum with a self-authenticating data value included in the data symbol and retrieved from the data symbol through the decrypting of the data symbol to determine if the decrypted data symbol is error free; and d) verifying a digital signature provided with the data symbol using a public digital signature key, wherein, if the comparison in step c) and the verification in step d) are successful, the data symbol is authenticated and validated.

8. The method according to claim 7, wherein the data symbol is determined to be encrypted in step a) by checking a value of a flag included with the data symbol, and wherein a particular public key is used to decrypt the data symbol based on the value of the flag.

9. A system for creating a self-authenticating check, comprising:

a database containing data to be used in creating the self-authenticating check;

a validation unit communicatively coupled to the database and configured to receive the data and to validate if the data is useable in creating the self-authenticating check;

a merge image and signature unit communicatively coupled to the validation unit and configured to merge an account digital signature key with the data received from the validation unit;

an encryption unit communicatively coupled to the merge image and signature unit and configured to encrypt the data with the account digital signature key;

a symbol creation unit communicatively coupled to the encryption unit and configured to further encrypt the data using a public key and private key-based encryption algorithm, wherein the merge image and signature unit merges the encrypted data output from the symbol creation unit with non-encrypted data to be used for decryption; and a printing unit communicatively coupled to the merge image and signature unit and configured to print a self-authenticating symbol onto the self-authenticating check, the self-authenticating symbol being based on the encrypted data output by the merge image and signature unit.

10. The system according to claim 9, further comprising a key manager communicatively coupled to the encryption unit and configured to provide a plurality of private keys that are indexed based on a time value.

11. The system according to claim 10, wherein the time value is a time of day value.

12. The system according to claim 9, wherein the symbol creation unit provides the encryption using the one-way hash value that is a hash value that is computed based on another hash value used to create another self-authenticating document that was created earlier in time than the self-authenticating document.

13. A method of providing a self-authenticating negotiable document, the method comprising the steps of:

a) receiving, by a single entity, a private key that is to be used to self-authenticate a negotiable document, the private key being received prior to creation of the negotiable document;

b) receiving, by the single entity, data to be included on the negotiable document;

c) signing, by the single entity, the negotiable document with a digital signature key;

d) providing, by the single entity, an authenticating data value by computing a one-way hash value from the data and the digital signature; and e) outputting, by the single entity, a data packet that includes the authenticating data value, wherein the data packet is used to provide data for creating a self-authentication symbol that is placed on the negotiable document.

14. The method according to claim 13, wherein the private key is provided to the single entity by a key manager, wherein the key manager provides a corresponding public key that is publicly accessible.

* * * * *